(12) United States Patent
Tsukagoshi

(10) Patent No.: US 10,575,062 B2
(45) Date of Patent: Feb. 25, 2020

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/738,824

(22) PCT Filed: Jul. 5, 2016

(86) PCT No.: PCT/JP2016/069953
§ 371 (c)(1),
(2) Date: Dec. 21, 2017

(87) PCT Pub. No.: WO2017/006948
PCT Pub. Date: Jan. 12, 2017

(65) Prior Publication Data
US 2018/0184173 A1    Jun. 28, 2018

(30) Foreign Application Priority Data
Jul. 9, 2015   (JP) .................................. 2015-138178

(51) Int. Cl.
*H04N 21/488*  (2011.01)
*H04N 21/435*  (2011.01)
(Continued)

(52) U.S. Cl.
CPC ....... *H04N 21/4884* (2013.01); *H04N 21/431* (2013.01); *H04N 21/435* (2013.01); *H04N 21/4355* (2013.01); *H04N 21/8153* (2013.01)

(58) Field of Classification Search
None
See application file for complete search history.

(56) References Cited

U.S. PATENT DOCUMENTS

| | | | |
|---|---|---|---|
| 2009/0162036 A1* | 6/2009 | Fujii | H04N 5/85 386/244 |
| 2014/0098289 A1* | 4/2014 | Jang | G11B 27/105 348/441 |

(Continued)

FOREIGN PATENT DOCUMENTS

| | | |
|---|---|---|
| JP | 2011-30180 A | 2/2011 |
| JP | 2016-28472 A | 2/2016 |

OTHER PUBLICATIONS

"Multimedia Coding Specification for Digital Broadcasting (Second Generation)," Association of Radio Industries and Businesses, ARIB STD-B62, Ver. 1.0-E1, vol. 1, Part 1, Jul. 31, 2014, (39 pages) (with English translation).

(Continued)

*Primary Examiner* — Michael R Telan
(74) *Attorney, Agent, or Firm* — Oblon, McClelland, Maier & Neustadt, L.L.P.

(57) ABSTRACT

Subtitles (graphics) can be superimposed and displayed on a video satisfactorily.
A container in a predetermined format including a video stream having video data with UHD resolution and a subtitle stream having subtitle data is received. The video data is obtained by decoding the video stream. Bitmap data of the subtitles is obtained by decoding the subtitle stream. In a case where a resolution of the subtitles does not match the UHD resolution, processing of converting a position of the subtitles is performed on the bitmap data of the subtitles. Video data for display is obtained by superimposing, on the video data, the bitmap data of the subtitles on which the processing of converting the position has been performed.

11 Claims, 17 Drawing Sheets

(51) Int. Cl.
*H04N 21/431* (2011.01)
*H04N 21/81* (2011.01)

(56) References Cited

U.S. PATENT DOCUMENTS

2017/0006316 A1* 1/2017 Hwang ............. H04N 21/2383
2017/0180767 A1* 6/2017 Oh ................... H04N 21/23614

OTHER PUBLICATIONS

"Timed Text Markup Language 1 (TTML1) (Second Edition)," (online) <URL: http://w3.org/TR/ttmll/>, W3C, Sep. 24, 2013, (3 pages).

"MMT-Based Media Transport Scheme in Digital Broadcasting Systems," Association of Radio Industries and Businesses, ARIB STD-B60, Ver. 1.0, Jul. 31, 2014, (20 pages) (with English translation).

"Digital Video Broadcasting (DVB); Subtitling systems DVB Document A009," (online) <URL: http://www.dvb.org/resources/public/standards/A009_DVB-Subtitling.pdf>, Jul. 2013, (5 pages).

International Search Report dated Oct. 11, 2016 in PCT/JP2016/069953 filed Jul. 5, 2016.

* cited by examiner

FIG. 4

| Syntax | Size | Type |
|---|---|---|
| display_difinition_segment() { | | |
| sync_byte | 8 | bslbf |
| segment_type | 8 | bslbf |
| page_id | 16 | uimsbf |
| segment_length | 16 | uimsbf |
| dds_version_number | 4 | uimsbf |
| display_window_flag | 1 | bslbf |
| display_positioning_type | 2 | uimsbf |
| reserved | 1 | |
| display_width | 16 | uimsbf |
| display_height | 16 | uimsbf |
| if (display_window_flag == 1) { | | |
| display_window_horizontal_position_minimum | 16 | uimsbf |
| display_window_horizontal_position_maximum | 16 | uimsbf |
| display_window_vertical_position_minimum | 16 | uimsbf |
| display_window_vertical_position_maximum | 16 | uimsbf |
| } | | |
| } | | |

FIG. 5

| display_positioning_type (2bits) | |
|---|---|
| '00' | SPECIFY POSITION IN HD DISPLAY AREA IN UNITS OF HD PIXELS |
| '01' | DEFINE HD DISPLAY AREA WITH window IN UHD DISPLAY AREA AND SPECIFY POSITION IN DISPLAY AREA OF window |
| '10' | SPECIFY POSITION IN UHD DISPLAY AREA IN UNITS OF UHD PIXELS |
| '11' | RESERVED |

FIG. 6

| Syntax | Size | Type |
|---|---|---|
| page_composition_segment() { | | |
| sync_byte | 8 | bslbf |
| segment_type | 8 | bslbf |
| page_id | 16 | bslbf |
| segment_length | 16 | uimsbf |
| page_time_out | 8 | uimsbf |
| page_version_number | 4 | uimsbf |
| page_state | 2 | bslbf |
| reserved | 2 | bslbf |
| while (processed_length < segment_length) { | | |
| region_id | 8 | bslbf |
| reserved | 8 | bslbf |
| region_horizontal_address | 16 | uimsbf |
| region_vertical_address | 16 | uimsbf |
| } | | |
| } | | |

FIG. 7

| Syntax | Size | Type |
| --- | --- | --- |
| region_composition_segment() { | | |
|     sync_byte | 8 | bslbf |
|     segment_type | 8 | bslbf |
|     page_id | 16 | bslbf |
|     segment_length | 16 | uimsbf |
|     region_id | 8 | uimsbf |
|     region_vesion_number | 4 | uimsbf |
|     region_fill_flag | 1 | bslbf |
|     reserved | 3 | bslbf |
|     region_width | 16 | uimsbf |
|     region_height | 16 | uimsbf |
|     region_level_of_compatibility | 3 | bslbf |
|     region_depth | 3 | bslbf |
|     reserved | 2 | bslbf |
|     CLUT_id | 8 | bslbf |
|     region_8-bit_pixel_code | 8 | bslbf |
|     region_4-bit_pixel_code | 4 | bslbf |
|     region_2-bit_pixel_code | 2 | bslbf |
|     reserved | 2 | bslbf |
|     while (processed_length < segment_length) { | | |
|         object_id | 16 | bslbf |
|         object_type | 2 | bslbf |
|         object_provider_flag | 2 | bslbf |
|         object_horizontal_position | 12 | uimsbf |
|         reserved | 4 | bslbf |
|         object_vertical_position | 12 | uimsbf |
|         if (object_type==0x01 or object_type==0x02){ | | |
|             foreground_pixel_code | 8 | bslbf |
|             background_pixel_code | 8 | bslbf |
|         } | | |
|     } | | |
| } | | |

FIG. 8

| Syntax | Size | Type |
|---|---|---|
| CLUT_definition_segment() { | | |
|   sync_byte | 8 | bslbf |
|   segment_type | 8 | bslbf |
|   page_id | 16 | bslbf |
|   segment_length | 16 | uimsbf |
|   CLUT_id | 8 | bslbf |
|   CLUT_version_number | 4 | uimsbf |
|   reserved | 4 | bslbf |
|   while (processed_length < segment_length) { | | |
|     CLUT_entry_id | 8 | bslbf |
|     2-bit/entry_CLUT_flag | 1 | bslbf |
|     4-bit/entry_CLUT_flag | 1 | bslbf |
|     8-bit/entry_CLUT_flag | 1 | bslbf |
|     reserved | 4 | bslbf |
|     full_range_flag | 1 | bslbf |
|     if full_range_flag=='1'{ | | |
|       Y-value | 8 | bslbf |
|       Cr-value | 8 | bslbf |
|       Cb-value | 8 | bslbf |
|       T-value | 8 | bslbf |
|     } else { | | |
|       Y-value | 6 | bslbf |
|       Cr-value | 4 | bslbf |
|       Cb-value | 4 | bslbf |
|       T-value | 2 | bslbf |
|     } | | |
|   } | | |
| } | | |

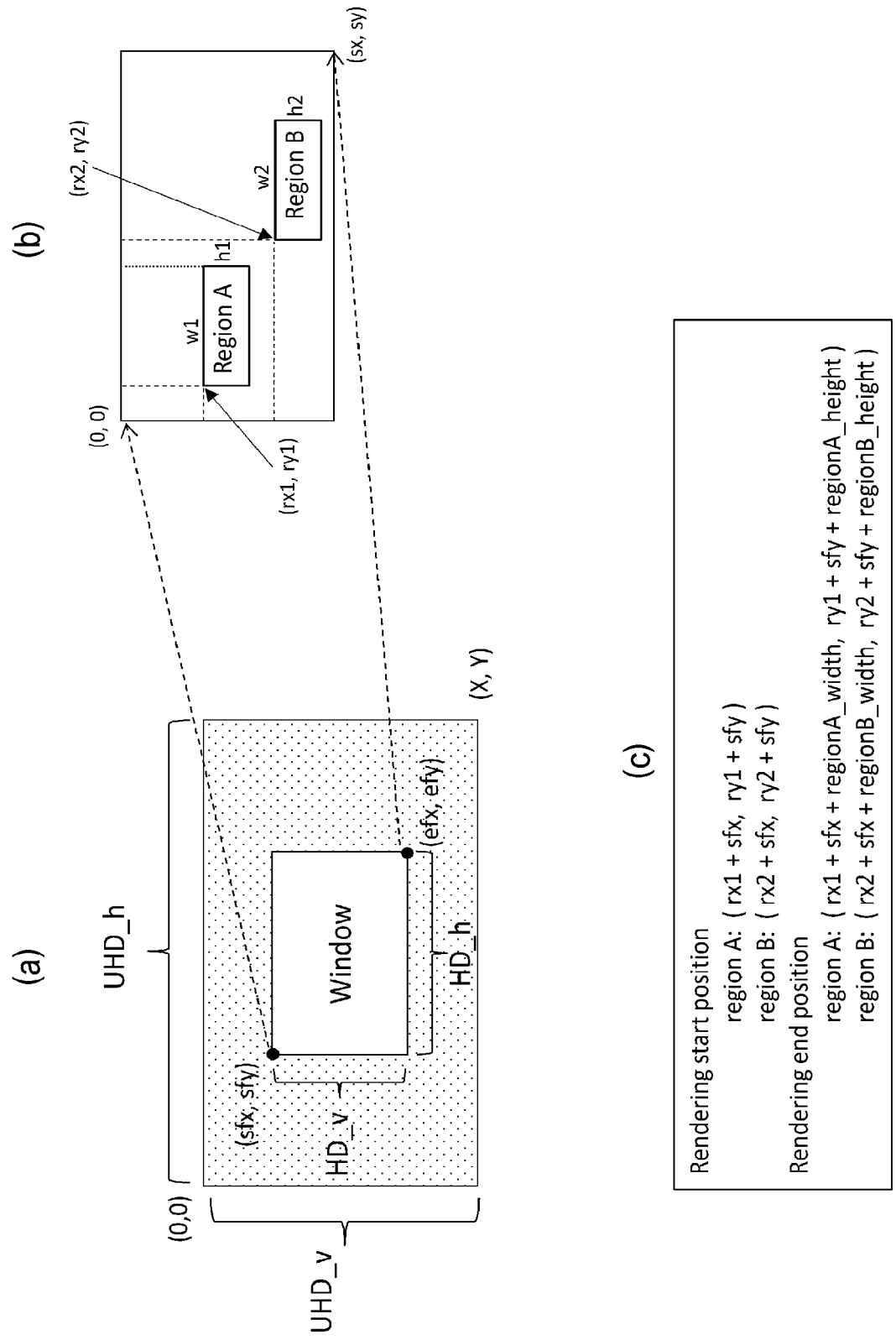

| Syntax | Size | Type |
|---|---|---|
| Component_descriptor() { | | |
| descriptor_tag | 8 | uimsbf |
| descriptor_length | 8 | uimsbf |
| display_positioning_type | 2 | |
| reserved | 2 | uimsbf |
| stream_content | 4 | |
| component_type | 8 | bslbf |
| component_tag | 8 | uimsbf |
| .. | | |
| } | | |

(b)

| | | |
|---|---|---|
| descriptor_tag | 0x50 | (component descriptor) |
| display_positioning_type (2bits) | | |
| | '00' | SPECIFY POSITION IN HD DISPLAY AREA IN UNITS OF HD PIXELS |
| | '01' | DEFINE HD DISPLAY AREA WITH window IN UHD DISPLAY AREA AND SPECIFY POSITION IN DISPLAY AREA OF window |
| | '10' | SPECIFY POSITION IN UHD DISPLAY AREA IN UNITS OF UHD PIXELS |
| | '11' | RESERVED |
| Stream_content(4bits) | | |
| | 0x03 | DVB subtitle |

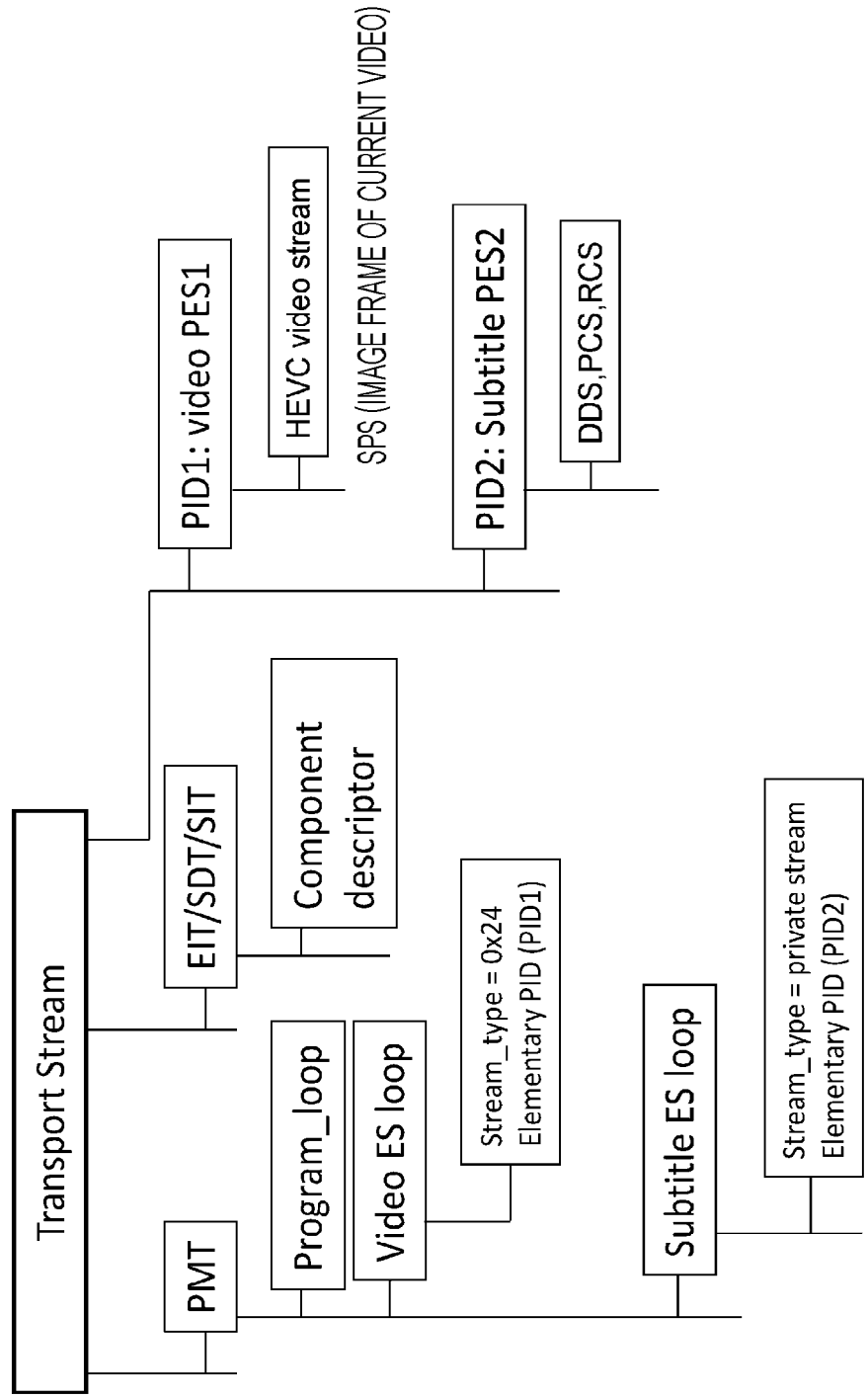

RECEPTION APPARATUS, RECEPTION METHOD, TRANSMISSION APPARATUS, AND TRANSMISSION METHOD

TECHNICAL FIELD

The present technology relates to a reception apparatus, a reception method, a transmission apparatus, and a transmission method, and particularly, to a reception apparatus or the like that superimposes and displays subtitles or graphics on a video.

BACKGROUND ART

In the broadcasting of digital video broadcasting (DVB), for example, the operation of transmitting subtitle data as bitmap data has been performed conventionally (for example, see Patent Document 1).

CITATION LIST

Patent Document

Patent Document 1: Japanese Patent Application Laid-Open No. 2011-030180

SUMMARY OF THE INVENTION

Problems to be Solved by the Invention

Conventional methods for transmitting subtitle data assume transmission of data whose accuracy is dependent on the resolution of the background video. Various subtitle resolutions are conceivable in video services with ultra high definition (UHD) resolution, such as 4K or 8K.

An object of the present technology is to enable subtitles (graphics) to be superimposed and displayed on a video satisfactorily.

Solutions to Problems

A concept of the present technology lies in a reception apparatus including:

a reception unit configured to receive a container in a predetermined format including a video stream having video data with UHD resolution and a subtitle stream having subtitle data; and a control unit configured to control:

video decoding processing of obtaining the video data by decoding the video stream;

subtitle decoding processing of obtaining bitmap data of subtitles by decoding the subtitle stream;

position conversion processing of, in a case where a resolution of the subtitles does not match the UHD resolution, performing processing of converting a position of the subtitles on the bitmap data of the subtitles; and video superimposing processing of superimposing, on the video data, the bitmap data of the subtitles on which the processing of converting the position has been performed.

According to the present technology, the reception unit receives the container in the predetermined format including the video stream having the video data with the UHD resolution and the subtitle stream having the subtitle data. The control unit controls the video decoding processing, the subtitle decoding processing, the position conversion processing, and the video superimposing processing. In the video decoding processing, the video stream is decoded, through which the video data is obtained. In the subtitle decoding processing, the subtitle stream is decoded, through which the bitmap data of the subtitles is obtained.

In a case where the resolution of the subtitles does not match the UHD resolution, the processing of converting the position of the subtitles is performed on the bitmap data of the subtitles in the position conversion processing. Then, the bitmap data of the subtitles on which the processing of converting the position has been performed is superimposed on the video data in the video superimposing processing. For example, the UHD resolution may exceed HD resolution and may also include 4K resolution or 8K resolution.

According to the present technology as described above, in a case where the resolution of the subtitles does not match the UHD resolution of a video, the processing of converting the position of the subtitles is performed on the bitmap data of the subtitles. Therefore, it is possible to superimpose and display the subtitles on the video satisfactorily. In other words, even in a case where the resolution of the subtitles does not match the UHD resolution of the video, it is possible to display the subtitles at an appropriate position of the background video.

Note that according to the present technology, the control unit may further control size conversion processing of performing processing of converting a size of the subtitles on the bitmap data of the subtitles on which the processing of converting the position has been performed, and the bitmap data of the subtitles on which the processing of converting the size has been performed may be superimposed on the video data in the video superimposing processing. In this case, it is possible to display the subtitles in an appropriate size.

Furthermore, another concept of the present technology lies in a reception apparatus including:

a reception unit configured to receive a container in a predetermined format including a video stream having video data with UHD resolution and a subtitle stream having subtitle data; and a control unit configured to control:

video decoding processing of obtaining the video data by decoding the video stream;

bitmap data obtaining processing of obtaining bitmap data of subtitles for display on the basis of the subtitle stream; and video superimposing processing of superimposing, on the video data, the bitmap data of the subtitles which has been obtained, in which identification information indicating a position specification method for the subtitles is inserted into a layer of the subtitle stream and/or a layer of the container, and the bitmap data obtaining processing obtains the bitmap data of the subtitles for display by performing, on the subtitle stream, processing corresponding to the position specification method indicated by the identification information.

According to the present technology, the reception unit receives the container in the predetermined format including the video stream having the video data with the UHD resolution and the subtitle stream having the subtitle data. The control unit controls the video decoding processing, the bitmap data obtaining processing, and the video superimposing processing. In the video decoding processing, the video stream is decoded, through which the video data is obtained. The identification information indicating the position specification method for the subtitles is inserted into the layer of the subtitle stream and/or the layer of the container.

In the bitmap data obtaining processing, the bitmap data of the subtitles for display is obtained on the basis of the subtitle stream. In the bitmap data obtaining processing, the processing corresponding to the position specification method indicated by the identification information is performed on the subtitle stream, through which the bitmap data of the subtitles for display is obtained. In the video superimposing processing, the bitmap data of the subtitles which has been obtained in this manner is superimposed on the video data.

For example, in a case where the position specification method indicated by the identification information is a method of specifying a position in an HD display area in units of HD pixels, the bitmap data obtaining processing may decode the subtitle stream to obtain bitmap data of the subtitles, and perform position conversion processing on this bitmap data on the basis of a ratio of the UHD resolution to the HD resolution to obtain the bitmap data of the subtitles for display.

Furthermore, for example, in a case where the position specification method indicated by the identification information is a method of defining an HD display area with a window in a UHD display area and specifying a position in a display area of this window, the bitmap data obtaining processing may decode the subtitle stream to obtain bitmap data of the subtitles, and perform position conversion processing on this bitmap data on the basis of information on the display area of the window to obtain the bitmap data of the subtitles for display.

Furthermore, for example, in a case where the position specification method indicated by the identification information is a method of specifying a position in a UHD display area in units of UHD pixels, the bitmap data obtaining processing may decode the subtitle stream to obtain bitmap data of the subtitles, and use this bitmap data as it is as the bitmap data of the subtitles for display.

According to the present technology as described above, the bitmap data of the subtitles for display is obtained by performing, on the subtitle stream, the processing corresponding to the position specification method indicated by the identification information. Therefore, it is possible to superimpose and display the subtitles on the video satisfactorily. For example, even in a case where the resolution of the subtitles does not match the UHD resolution of the video, it is possible to display the subtitles at an appropriate position of the background video.

Note that according to the present technology, for example, the control unit may further control a subtitle processing unit configured to perform processing of converting a size of the subtitles on the bitmap data of the subtitles which has been obtained by the bitmap data obtaining processing, and the bitmap data of the subtitles on which the processing of converting the size has been performed may be superimposed on the video data in the video superimposing processing. In this case, it is possible to display the subtitles in an appropriate size.

Furthermore, another concept of the present technology lies in a transmission apparatus including:

a transmission unit configured to transmit a container in a predetermined format including a video stream having video data with UHD resolution and a subtitle stream having subtitle data; and an information insertion unit configured to insert identification information indicating a position specification method for subtitles into a layer of the subtitle stream and/or a layer of the container.

According to the present technology, the transmission unit transmits the container in the predetermined format including the video stream having the video data with the UHD resolution and the subtitle stream having the subtitle data. The information insertion unit inserts the identification information indicating the position specification method for the subtitles into the layer of the subtitle stream and/or the layer of the container.

For example, the information insertion unit may insert the identification information under an event information table, a service description table, or a selection information table. Furthermore, the information insertion unit may insert the identification information into a display definition segment, for example.

The position specification method for the subtitles may include a method of specifying a position in an HD display area in units of HD pixels, for example. Furthermore, the position specification method for the subtitles may include a method of defining an HD display area with a window in a UHD display area and specifying a position in a display area of this window, for example. Furthermore, the position specification method for the subtitles may include a method of specifying a position in a UHD display area in units of UHD pixels, for example.

According to the present technology as described above, the identification information indicating the position specification method for the subtitles is inserted into the layer of the subtitle stream and/or the layer of the container and transmitted. On the reception side, therefore, the processing corresponding to the position specification method indicated by this identification information is performed on the subtitle stream, through which bitmap data of subtitles for display is obtained. As such, the subtitles can be superimposed and displayed on a video satisfactorily.

Furthermore, another concept of the present technology lies in a reception apparatus including:

a reception unit configured to receive a container in a predetermined format including a video stream having video data with UHD resolution and a graphics stream having graphics data; and a control unit configured to control:

video decoding processing of obtaining the video data by decoding the video stream;

graphics decoding processing of obtaining bitmap data of graphics by decoding the graphics stream;

position conversion processing of, in a case where a resolution of the graphics does not match the UHD resolution, performing processing of converting a position of the graphics on the bitmap data of the graphics; and video superimposing processing of superimposing, on the video data, the bitmap data of the graphics on which the processing of converting the position has been performed.

Furthermore, another concept of the present technology lies in a reception apparatus including:

a reception unit configured to receive a container in a predetermined format including a video stream having video data with UHD resolution and a graphics stream having graphics data; and a control unit configured to control:

video decoding processing of obtaining the video data by decoding the video stream;

bitmap data obtaining processing of obtaining bitmap data of graphics for display on the basis of the graphics stream; and video superimposing processing of superimposing, on the video data, the bitmap data of the graphics which has been obtained, in which identification information indicating a position specification method for the graphics is inserted into a layer of the graphics stream and/or a layer of the container, and the bitmap data obtaining processing obtains the bitmap data of the graphics for display by performing, on the graphics stream, processing corresponding to the position specification method indicated by the identification information.

Furthermore, another concept of the present technology lies in a transmission apparatus including:

a transmission unit configured to transmit a container in a predetermined format including a video stream having video data with UHD resolution and a graphics stream having graphics data; and an information insertion unit configured to insert identification information indicating a position specification method for graphics into a layer of the graphics stream and/or a layer of the container.

Effects of the Invention

According to the present technology, it is possible to superimpose and display subtitles on a video satisfactorily. Note that the effects described in this specification are merely examples and not limited thereto, and additional effects may also be included.

BRIEF DESCRIPTION OF DRAWINGS

FIG. 4 is a diagram illustrating an exemplary structure of a display definition segment.

FIG. 5 is a diagram illustrating contents of a "display_positioning_type" field in the display definition segment.

FIG. 6 is a diagram illustrating an exemplary structure of a page composition segment.

FIG. 7 is a diagram illustrating an exemplary structure of a region composition segment.

FIG. 8 is a diagram illustrating an exemplary structure of a CLUT definition segment.

FIG. 9 is a diagram for describing a second method (method of defining an HD display area with a window in a UHD display area and specifying a position in a display area of this window) as a position specification method for the subtitles.

FIG. 13 is a diagram illustrating an exemplary structure of a component descriptor and contents of main information in this exemplary structure.

FIG. 14 is a diagram illustrating an exemplary configuration of a transport stream TS.

MODE FOR CARRYING OUT THE INVENTION

Hereinafter, a mode for carrying out the invention (hereinafter referred to as "embodiment") will be described. Note that the description will be given in the following order.
1. Embodiment
2. Modification

1. EMBODIMENT

[Exemplary Configuration of Transmission and Reception System]

Figure 1:
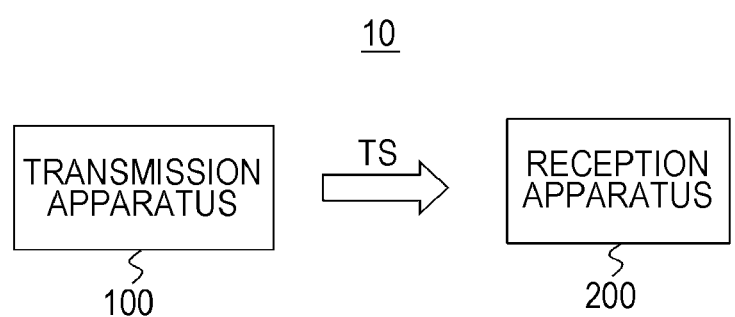
FIG. 1 is a block diagram illustrating an exemplary configuration of a transmission and reception system as an embodiment.

FIG. 1 illustrates an exemplary configuration of a transmission and reception system 10 as an embodiment. This transmission and reception system 10 includes a transmission apparatus 100 and a reception apparatus 200.

The transmission apparatus 100 generates a transport stream TS of MPEG 2 as a container, and transmits this transport stream TS on a broadcast wave or in a network packet. This transport stream TS includes a video stream having video data (image data) with UHD resolution. Here, the UHD resolution exceeds HD resolution and includes 4K resolution or 8K resolution.

Furthermore, this transport stream TS includes a subtitle stream having subtitle data (caption data). Here, the subtitle data is bitmap data of subtitles. Identification information is inserted into a layer of the subtitle stream and/or a layer of the transport stream TS as the container. The identification information indicates a position specification method for the subtitles.

In the present embodiment, the position specification method for the subtitles includes the following the first to third methods.

First method: a method of specifying a position in an HD display area in units of HD pixels Second method: a method of defining an HD display area with a window in a UHD display area and specifying a position in a display area of this window Third method: a method of specifying a position in a UHD display area in units of UHD pixels The reception apparatus 200 receives the transport stream TS transmitted from the transmission apparatus 100. The reception apparatus 200 obtains the video data by performing decoding processing on the video stream. Furthermore, the reception apparatus 200 obtains bitmap data of subtitles for display on the basis of the subtitle stream. The reception apparatus 200 performs size conversion processing on this bitmap data of the subtitles for display, as necessary. Then, the reception apparatus 200 superimposes this bitmap data of the subtitles for display on the video data to obtain video data for display.

Here, in a case where the position specification method indicated by the identification information is the first method, the reception apparatus 200 performs decoding processing on the subtitle stream to obtain bitmap data of the subtitles, and performs position conversion processing on this bitmap data on the basis of a ratio of the UHD resolution to the HD resolution to obtain the bitmap data of the subtitles for display.

Furthermore, in a case where the position specification method indicated by the identification information is the second method, the reception apparatus 200 performs decoding processing on the subtitle stream to obtain bitmap data of the subtitles, and performs position conversion processing on this bitmap data on the basis of information on the display area of the window to obtain the bitmap data of the subtitles for display.

Furthermore, in a case where the position specification method indicated by the identification information is the third method, the reception apparatus 200 performs decoding processing on the subtitle stream to obtain bitmap data of the subtitles, and uses this bitmap data as it is as the bitmap data of the subtitles for display.

"Display Position of Subtitles on Background Video"

Figure 2:
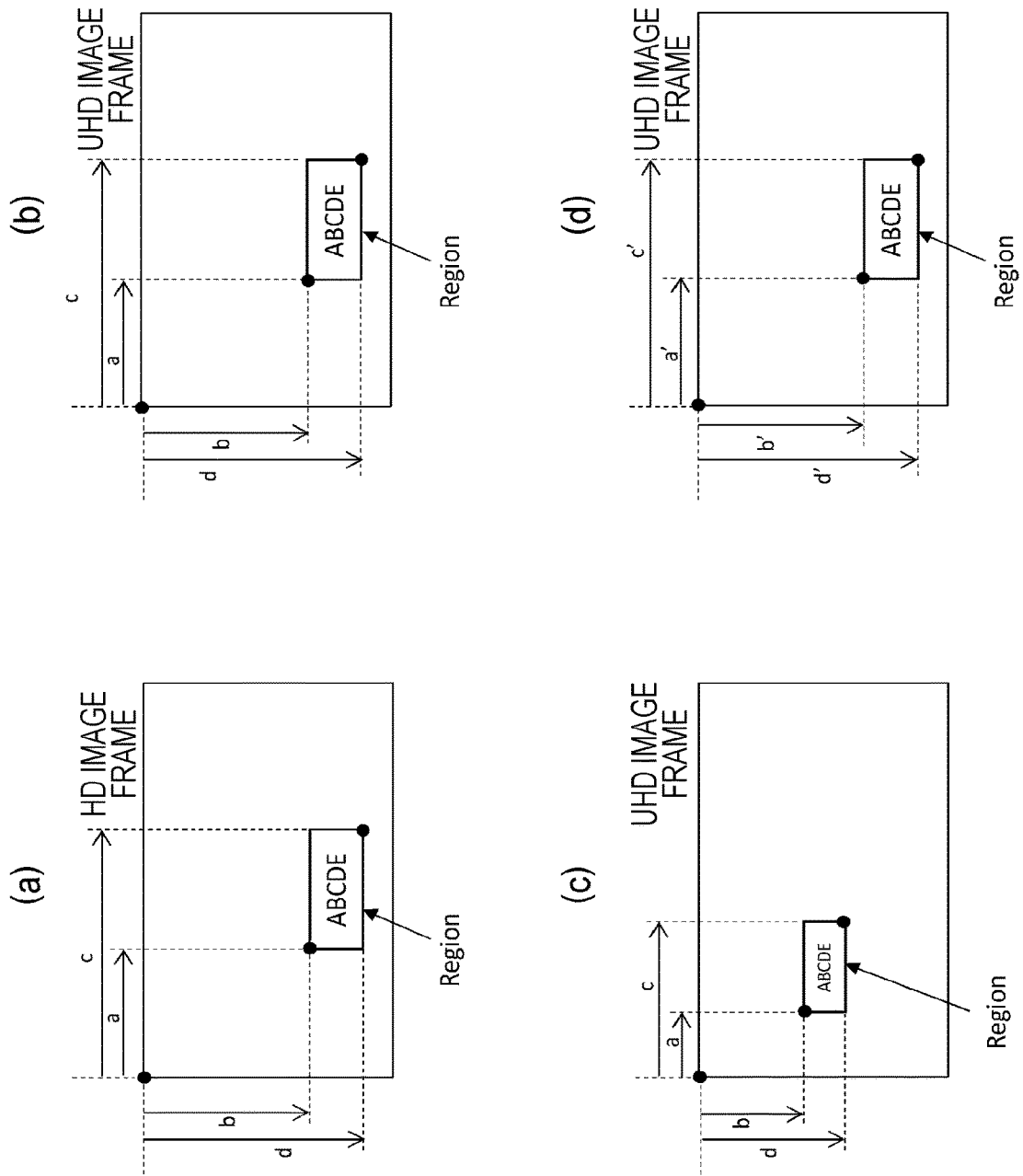
FIG. 2 is a diagram for describing a display position of subtitles and conversion of the position thereof on a background video.

Here, a description will be given of the display position of the subtitles on a background video. FIG. 2(*a*) illustrates an example where the video has HD resolution and the subtitles are compliant with the HD resolution. The pixel position at the start point of a region is (a, b), and the pixel position at its end point is (c, d). The region is a display area of the subtitles. In this case, the resolution of the background video matches the resolution of the subtitles. Therefore, the reception side can display the subtitles at the position intended by the production side on the background video without performing the position conversion processing for the subtitles.

FIG. 2(*b*) illustrates an example where the video has UHD resolution and the subtitles are compliant with the same UHD resolution. The pixel position at the start point of a region is (a, b), and the pixel position at its end point is (c, d). The region is a display area of the subtitles. In this case, the resolution of the background video matches the resolution of the subtitles. Therefore, the reception side can display the subtitles at the position intended by the production side on the background video without performing the position conversion processing for the subtitles. Since the position conversion processing is not performed by the reception side, this example corresponds to the case where the above-described position specification method for the subtitles is the third method.

FIG. 2(*c*) illustrates an example where the video has UHD resolution and the subtitles are compliant with HD resolution. The pixel position at the start point of a region is (a, b), and the pixel position at its end point is (c, d). The region is a display area of the subtitles. In this case, the resolution of the background video is higher than the resolution of the subtitles. Therefore, the display position of the subtitles on the background video is not at the position intended by the production side but deviates to the upper right.

In this case, performing the position conversion processing for the subtitles enables the reception side to display the subtitles at the position intended by the production side on the background video. FIG. 2(*d*) illustrates an example where the position conversion processing has been performed. The pixel position at the start point of the region is (a', b'), and the pixel position at its end point is (c', d'). The region is a display area of the subtitles. Note that in this example, the size conversion processing is also performed for the subtitles, simultaneously with the position conversion. Since the position conversion processing is performed by the reception side, this example corresponds to the case where the above-described position specification method for the subtitles is either the first method or the second method.

"Exemplary Configuration of Transmission Apparatus"

Figure 3:
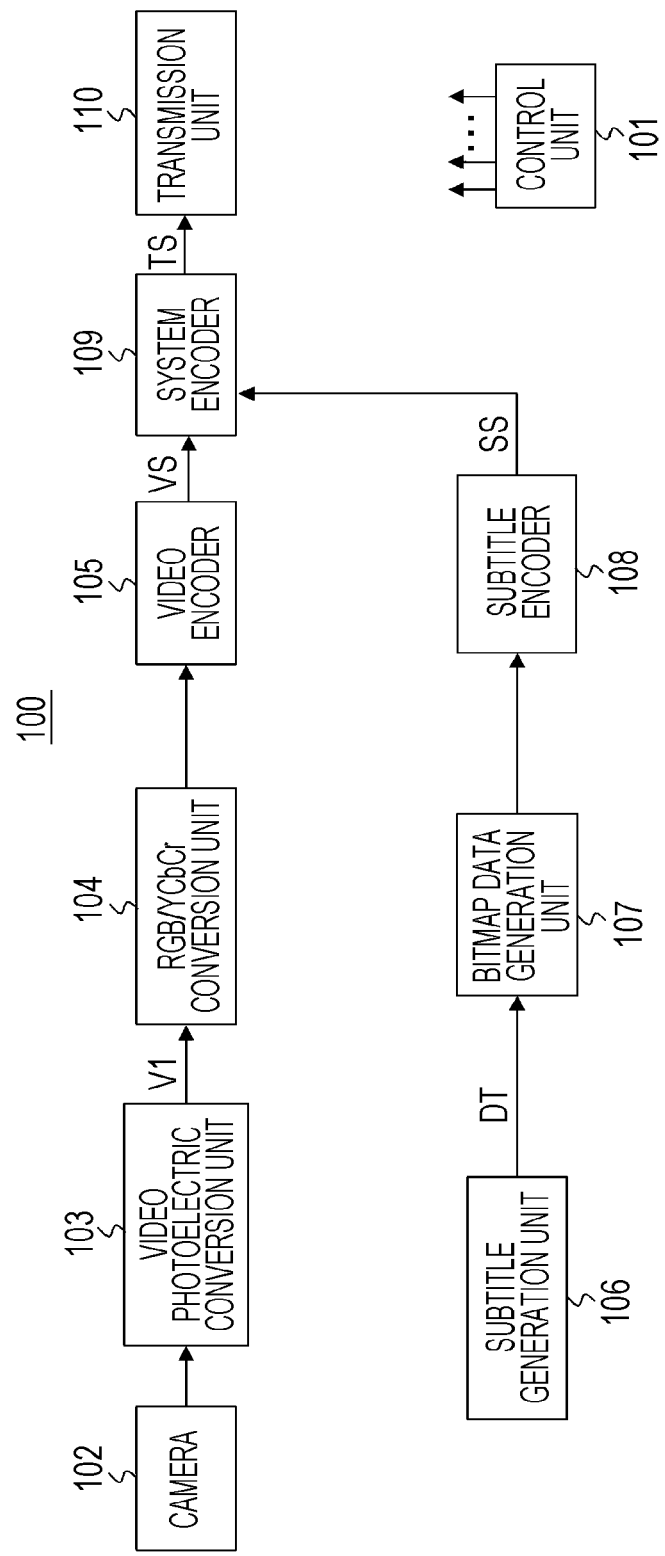
FIG. 3 is a block diagram illustrating an exemplary configuration of a transmission apparatus.

FIG. 3 illustrates an exemplary configuration of the transmission apparatus 100. This transmission apparatus 100 includes a control unit 101, a camera 102, a video photoelectric conversion unit 103, an RGB/YCbCr conversion unit 104, a video encoder 105, a subtitle generation unit 106, a bitmap data generation unit 107, a subtitle encoder 108, a system encoder 109, and a transmission unit 110.

The control unit 101 includes a central processing unit (CPU), and controls the operation of each unit of the transmission apparatus 100 on the basis of a control program. The camera 102 captures an image of an object and outputs video data (image data) with UHD resolution such as 4K resolution or 8K resolution. The video photoelectric conversion unit 103 photoelectrically converts the video data obtained by the camera 102 to obtain transmission video data V1.

The RGB/YCbCr conversion unit 104 converts the transmission video data from an RGB domain to a YCbCr (luminance and chrominance) domain. The video encoder 105 performs encoding, for example, MPEG4-AVC or HEVC, on the transmission video data V1 which has been converted into the YCbCr domain. The video encoder 105 then generates a video stream (PES stream) VS including the encoded video data.

The subtitle generation unit 106 generates text data (character code) DT as subtitle information. The bitmap data generation unit 107 receives the text data DT generated by the subtitle generation unit 106 and generates bitmap data of the subtitles. The subtitle encoder 108 converts the bitmap data of the subtitles and display control information into various segments and generates a subtitle stream SS including a PES packet in which these segments are arranged in a payload.

Information on the resolution of the subtitles is included in a display definition segment (display_difinition_segment). In the present embodiment, furthermore, the identification information indicating the position specification method for the subtitles is also included in this display definition segment.

FIG. 4 illustrates an exemplary structure (Syntax) of the display definition segment. A 1-bit field of "display_window_flag" indicates whether there is a definition of the window. "1" indicates there is the definition of the window. "0" indicates there is no definition of the window. A 2-bit field of "display_positioning_type" indicates the position specification method for the subtitles.

As illustrated in FIG. 5, "00" indicates the first method, that is, the method of specifying a position in an HD display area in units of HD pixels. "01" indicates the second method, that is, the method of defining an HD display area with a window in a UHD display area and specifying a position in a display area of this window. "10" indicates the third method, that is, the method of specifying a position in a UHD display area in units of UHD pixels.

Referring back to FIG. 4, a 16-bit field of "display_width" and a 16-bit field of "display_height" indicate the resolution of the subtitles. For example, "display_width" indicates 1920 in case of the HD resolution, while 3820 in case of the 4K resolution. Furthermore, for example, "display_height" indicates 1080 in case of the HD resolution, while 2160 in case of the 4K resolution.

In case of "display_window_flag"="1", there exist fields indicating the area of the window. That is, there exist a 16-bit field of "display_window_horizontal_position_minimum", a 16-bit field of "display_window_horizontal_position_maximum", a 16-bit field of "display_window_vertical_position_minimum", and a 16-bit field of "display_window_vertical_position_maximum".

The "display_window_horizontal_position_minimum" and "display_window_vertical_position_minimum" fields indicate the coordinates of the start point of the window. The "display_window_horizontal_position_maximum" and "display_window_vertical_position_maximum" fields indicate the coordinates of the end point of the window.

Furthermore, information on the start position of a region (Region), which is a display area of the subtitles, is included in a page composition segment (page_composition_segment). FIG. 6 illustrates an exemplary structure (Syntax) of the page composition segment. A "region_horizontal_address" field and a "region_vertical_address" field indicate the coordinates of the start position of the region (Region).

Furthermore, information indicating the horizontal and vertical sizes of the region is included in a region composition segment (region_composition_segment). FIG. 7 illustrates an exemplary structure (Syntax) of the region composition segment. A "region_width" field and a "region_height" field indicate the horizontal size and the vertical size of the region, respectively.

Furthermore, information indicating a mixing ratio of the subtitles (caption) and the background video is included in a CLUT definition segment (CLUT_definition_segment). FIG. 8 illustrates an exemplary structure (Syntax) of the CLUT definition segment. A "T-value" field indicates the mixing ratio of the subtitles and the background video.

Here, a description will be given of the setting of a value of each field in each position specification method for the subtitles. First, a description will be given of the case of the second method ("display_positioning_type"="01"). In this case, the "display_width" and "display_height" fields of the display definition segment (see FIG. 4) indicate a UHD display area illustrated in FIG. 9(a). The coordinates of the start point of this UHD display area are (0, 0) and the coordinates of its end point are (x, y). In this case, "display_width"=UHD_h, and "display_height"=UHD_v.

Additionally, in this case, "display_window_flag" of the display definition segment (see FIG. 4) is "1", and there exist the fields indicating the area of the window. This window has the same size as the HD display area, that is, the size in the horizontal direction is HD_h and the size in the vertical direction is HD_v.

The "display_window_horizontal_position_minimum" and "display_window_vertical_position_minimum" fields of the display definition segment (see FIG. 4) indicate the coordinates (sfx, sfy) of the start point of the window. Furthermore, the "display_window_horizontal_position_maximum" and "display_window_vertical_position_maximum" fields of the display definition segment (see FIG. 4) indicate the coordinates (efx, efy) of the end point of the window.

In this case, as illustrated in FIG. 9(b), the coordinates of the start positions of regions indicated by the "region_horizontal_address" and "region_vertical_address" fields of the page composition segment (see FIG. 6) assume the coordinates (sfx, sfy) of the start point of the window to be the base point.

Here, in a case where the start point (0, 0) of the UHD display area serves as the base point, the display start position (Rendering start position) and display end position (Rendering end position) of each of a Region A and a Region B are denoted as illustrated in FIG. 9(c). That is, in a case where the Region A and the Region B are displayed on the background video with the UHD resolution, the conversion (position conversion) into the UHD coordinate system is performed by adding an offset of the window. Adding the offset in this manner can display the subtitles with the HD resolution on the background video with the UHD resolution.

Figure 10:
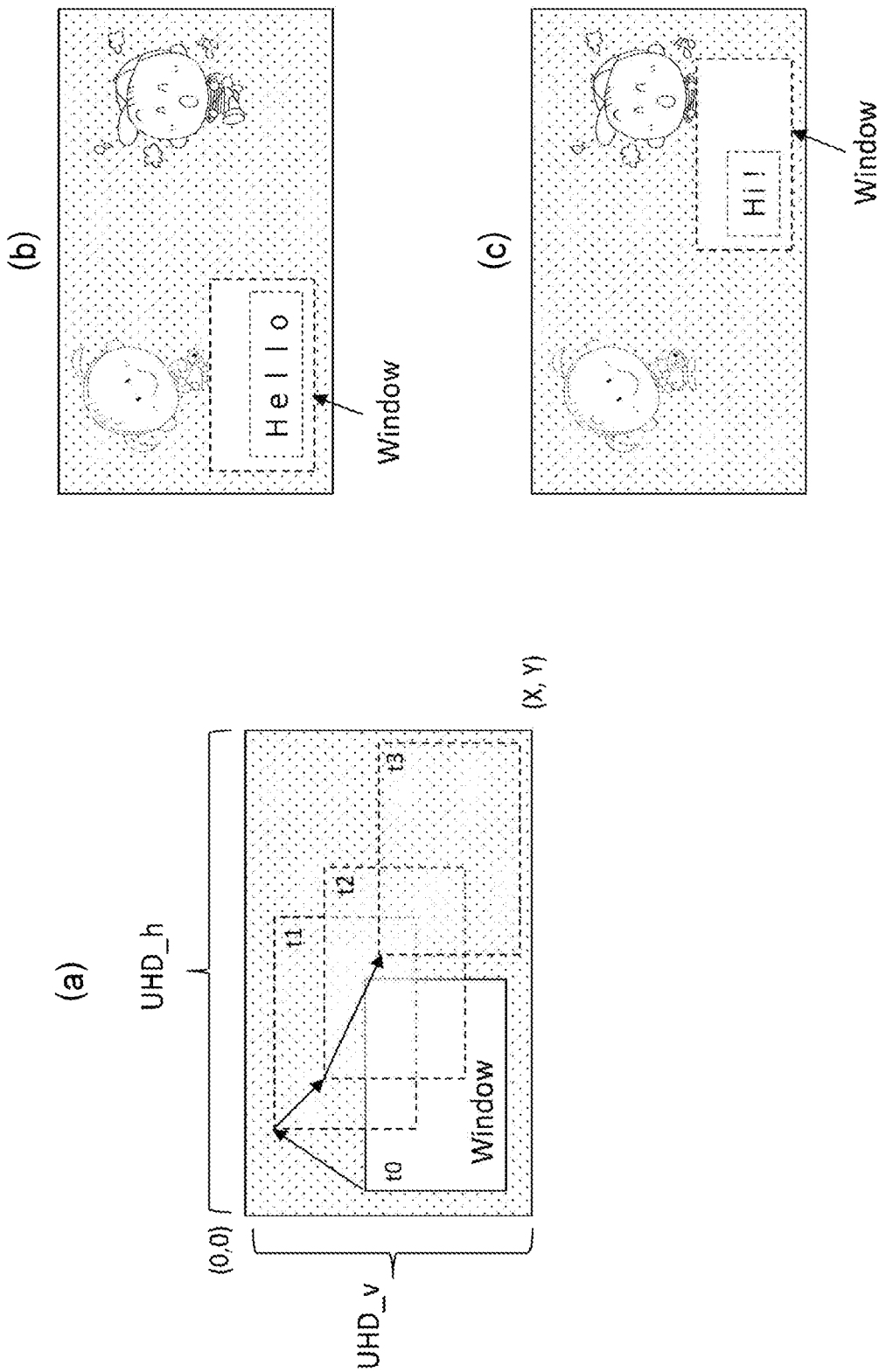
FIG. 10 is a diagram for describing a case where a position of the window is changed in chronological order in the second method.

In this case, the display area of the subtitles is limited within the window. However, as illustrated in FIG. 10(a), changing the position of the window in chronological order can display the subtitles, using the entire UHD display area. FIGS. 10(b) and 10(c) illustrate examples where changing the position of the window changes the display position of the subtitles in the UHD display area.

Next, a description will be given of the case of the third method ("display_positioning_type"="10"). In this case, the "display_width" and "display_height" fields of the display definition segment (see FIG. 4) indicate a UHD display area illustrated in FIG. 11(a). The coordinates of the start point of this UHD display area are (0, 0) and the coordinates of its end point are (x, y). In this case, "display_width"=UHD_h, and "display_height"=UHD_v. In this case, "display_window_flag" of the display definition segment (see FIG. 4) is "0", and there is no field indicating the area of the window.

In this case, as illustrated in FIG. 11(a), the coordinates of the start positions of regions indicated by the "region_horizontal_address" and "region_vertical_address" fields of the page composition segment (see FIG. 6) assume the coordinates (0, 0) of the start point of the UHD display area to be the base point.

Here, the display start position (Rendering start position) and display end position (Rendering end position) of each of a Region A and a Region B are denoted as illustrated in FIG. 11(b). In a case where the Region A and the Region B are displayed on the background video with the UHD resolution, the conversion (position conversion) into the UHD coordinate system is not necessary since the Region A and the Region B are already in the UHD coordinate system.

Figure 12:
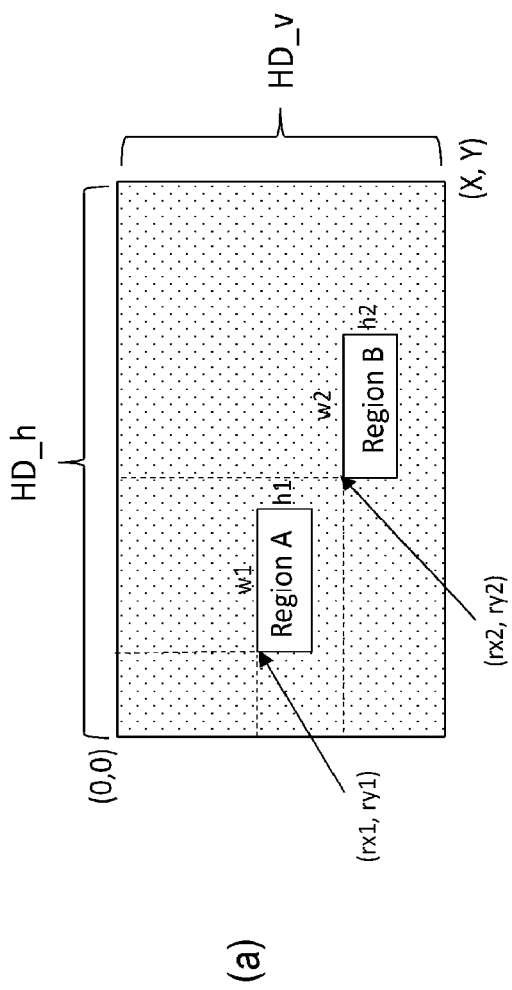
FIG. 12 is a diagram for describing a first method (method of specifying a position in an HD display area in units of HD pixels) as the position specification method for the subtitles.

Next, a description will be given of the case of the first method ("display_positioning_type"="00"). In this case, the "display_width" and "display_height" fields of the display definition segment (see FIG. 4) indicate an HD display area illustrated in FIG. 12(a). The coordinates of the start point of this HD display area are (0, 0) and the coordinates of its end point are (x, y). In this case, "display_width"=HD_h, and "display_height"=HD_v. In this case, "display_window_flag" of the display definition segment (see FIG. 4) is "0", and there is no field indicating the area of the window.

In this case, as illustrated in FIG. 12(a), the coordinates of the start positions of regions indicated by the "region_horizontal_address" and "region_vertical_address" fields of the page composition segment (see FIG. 6) assume the coordinates (0, 0) of the start point of the HD display area to be the base point.

Here, the display start position (Rendering start position) and display end position (Rendering end position) of each of a Region A and a Region B are denoted as illustrated in FIG. 12(h). In a case where the Region A and the Region B are displayed on the background video with the UHD resolution, the conversion (position conversion) of the Region A and the Region B into the UHD coordinate system is necessary. In this case, the conversion (position conversion) into the UHD coordinate system can be made on the basis of a ratio m of the UHD resolution to the HD resolution (for example, m=2 in a case where the UHD resolution is 4K, while m=4 in a case where the UHD resolution is 8K). Note that the information on the UHD resolution of the video can be detected from a parameter set (SPS) of the video stream.

Referring back to FIG. 3, the system encoder 109 generates a transport stream TS including the video stream VS generated by the video encoder 105 and the subtitle stream SS generated by the subtitle encoder 108 or a subtitle encoder 113. The transmission unit 110 transmits this transport stream TS to the reception apparatus 200 on a broadcast wave or in a network packet.

At this time, the system encoder 109 inserts the identification information to a layer of the transport stream TS as the container. The identification information indicates the position specification method for the subtitles. Specifically, the system encoder 109 inserts the identification information into a component descriptor (Component_descriptor) which is inserted under an event information table (EIT), a service description table (SDT), a selection information table (SIT), or the like.

FIG. 13(a) illustrates an exemplary structure (Syntax) of the component descriptor for this case. FIG. 13(b) illustrates contents (Semantics) of the main information in this exemplary structure. An 8-bit field of "descriptor_tag" indicates a descriptor type, which is set to "0x50" here, indicating the component descriptor. An 8-bit field of "descriptor_length" indicates the length (size) of the descriptor, which indicates the number of subsequent bytes as the length of the descriptor.

A 2-bit field of "display_positioning_type" indicates the position specification method for the subtitles. "00" indicates the first method, that is, the method of specifying a position in an HD display area in units of HD pixels. "01" indicates the second method, that is, the method of defining an HD display area with a window in a UHD display area and specifying a position in a display area of this window. "10" indicates the third method, that is, the method of specifying a position in a UHD display area in units of UHD pixels. A 4-bit field of "stream_content" indicates the type of the stream. "0x03" is set here, indicating DVB subtitles.

"Exemplary Configuration of Transport Stream TS"

FIG. 14 illustrates an exemplary configuration of the transport stream TS. In this exemplary configuration, there exists a PES packet "Video PES1" for the video stream identified by PID1. In this exemplary configuration, furthermore, there exists a PES packet "Subtitle PES2" for the subtitle stream identified by PID2.

A video-encoded stream is inserted into the PES packet for the video stream. Furthermore, various segments including the bitmap data of the subtitles and the display control information are inserted into the PES packet for the subtitle stream. The identification information indicating the position specification method for the subtitles is included in the display definition segment (DDS) (see FIG. 4).

Furthermore, the transport stream TS includes a program map table (PMT) as program specific information (PSI). The PSI is information describing which program each elementary stream included in the transport stream belongs to. In the PMT, there exists a program loop (Program loop) describing information related to the entire program.

In the PMT, furthermore, there exist elementary stream loops having information related to respective elementary streams. In this exemplary configuration, there exist a video elementary stream loop (video ES loop) corresponding to the video stream and a subtitle elementary stream loop (Subtitle ES loop) corresponding to the subtitle stream.

In the video elementary stream loop (video ES loop), not only is information such as a stream type and a packet identifier (PID) corresponding to the video stream arranged, but also a descriptor describing information related to this video stream is arranged. A value of "Stream_type" of this video stream is set to, for example, a value of "0x24" indicating an HEVC video stream. The PID information indicates PID1 which is added to the PES packet "video PES1" for the video stream.

In the subtitle elementary stream loop (Subtitle ES loop), not only is information such as a stream type and a packet identifier (PID) corresponding to the subtitle stream arranged, but also a descriptor describing information related to this subtitle stream is arranged. A value of "Stream_type" of this subtitle stream is set to, for example, a value indicating a private stream. The PID information indicates PID2 which is added to the PES packet "Subtitle PES2" for the subtitle stream.

Furthermore, the transport stream TS includes the event information table (EIT) as serviced information (SI) that conducts management for each event. In this EIT, metadata for each program is described. Under this EIT, the component descriptor (Component_descriptor) (see FIG. 13(a)) is inserted. The component descriptor includes the identification information indicating the position specification method for the subtitles.

Note that the transport stream TS also includes the service description table (SDT) and the selection information table (SIT). In the SDT, information on an organization channel such as the name of the organization channel and the name of a broadcaster is described. In the SIT, stream information of a partial TS and information on a service and an event to be transmitted in the stream are described. In some cases, the component descriptor is inserted under these tables.

The operation of the transmission apparatus 100 illustrated in FIG. 3 will be briefly described. The video data (image data) with the UHD resolution captured and obtained by the camera 102 is supplied to the video photoelectric conversion unit 103. In the video photoelectric conversion unit 103, the video data obtained by the camera 102 is photoelectrically converted, through which the transmission video data V1 is obtained.

In the RGB/YCbCr conversion unit 104, the transmission video data V1 obtained in the video photoelectric conversion unit 103 is converted from the RGB domain to the YCbCr (luminance and chrominance) domain, and subsequently supplied to the video encoder 105. In the video encoder 105, encoding processing, for example, MPEG4-AVC or HEVC is performed on this transmission video data V1, through which the video stream (PES stream) VS including the encoded video data is generated.

In the subtitle generation unit 106, the text data (character code) DT is generated as subtitle information. This text data DT is supplied to the bitmap data generation unit 107. In the bitmap data generation unit 107, the bitmap data of the subtitles is generated on the basis of the text data DT.

The bitmap data of the subtitles is supplied to the subtitle encoder 108. In the subtitle encoder 108, the bitmap data of the subtitles and the display control information are converted into various segments, through which the subtitle stream SS including the PES packet in which these segments are arranged in the payload is generated.

In this case, the information on the resolution of the subtitles ("display_width", "display_height") is included in the display definition segment (DDS) (see FIG. 4). In this DDS, furthermore, the identification information ("display_positioning_type") indicating the position specification method for the subtitles is also included.

Furthermore, in a case where the identification information indicates the second method (method of providing a definition in an HD display area with a window in a UHD display area and specifying a position in a display area of this window), the information indicating the area of the window ("display_window_horizontal_position_minimum", "display_window_horizontal_position_maximum", "display_window_vertical_position_minimum", "display_window_vertical_position_maximum") is included in this DDS.

Furthermore, the coordinates ("region_horizontal_address", "region_vertical_address") of the start position of the region are included in the page composition segment (PCS) (see FIG. 6). In a case where the identification information indicates the second method (method of providing a definition in an HD display area with a window in a UHD display area and specifying a position in a display area of this window), these coordinates assume the coordinates (sfx, sfy) of the start point of the window to be the base point (see FIG. 9).

Figure 11:
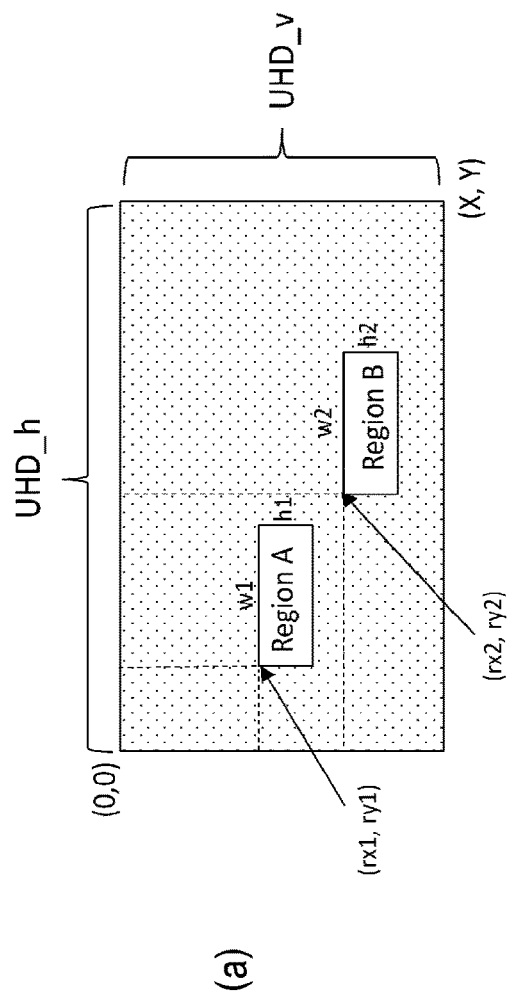
FIG. 11 is a diagram for describing a third method (method of specifying a position in a UHD display area in units of UHD pixels) as the position specification method for the subtitles.

Furthermore, in a case where the identification information is of the third method (method of specifying a position in an HD display area in units of HD pixels), these coordinates assume the coordinates (0, 0) of the start point of the UHD display area to be the base point (see FIG. 11). Furthermore, in a case where the identification information indicates the first method (method of specifying a position in an HD display area in units of HD pixels), these coordinates assume the coordinates (0, 0) of the start point of the UHD display area to be the base point (see FIG. 12).

Furthermore, the information ("region_width", "region_height") indicating the horizontal and vertical sizes of the region is included in the region composition segment (RCS) (see FIG. 7).

The video stream VS generated in the video encoder 105 is supplied to the system encoder 109. The subtitle stream SS generated in the subtitle encoder 108 is supplied to the system encoder 109. In the system encoder 109, the transport stream TS including the video stream VS and the subtitle stream SS is generated.

At this time, the component descriptor (Component_descriptor) (see FIG. 13) having the identification information ("display_positioning_type") indicating the position specification method for the subtitles is inserted under the EIT, the SDT, the SIT, or the like in the system encoder 109. The transport stream TS generated in the system encoder 109 is transmitted from the transmission unit 110 to the reception apparatus 200 on a broadcast wave or in a network packet.

"Exemplary Configuration of Reception Apparatus"

Figure 15:
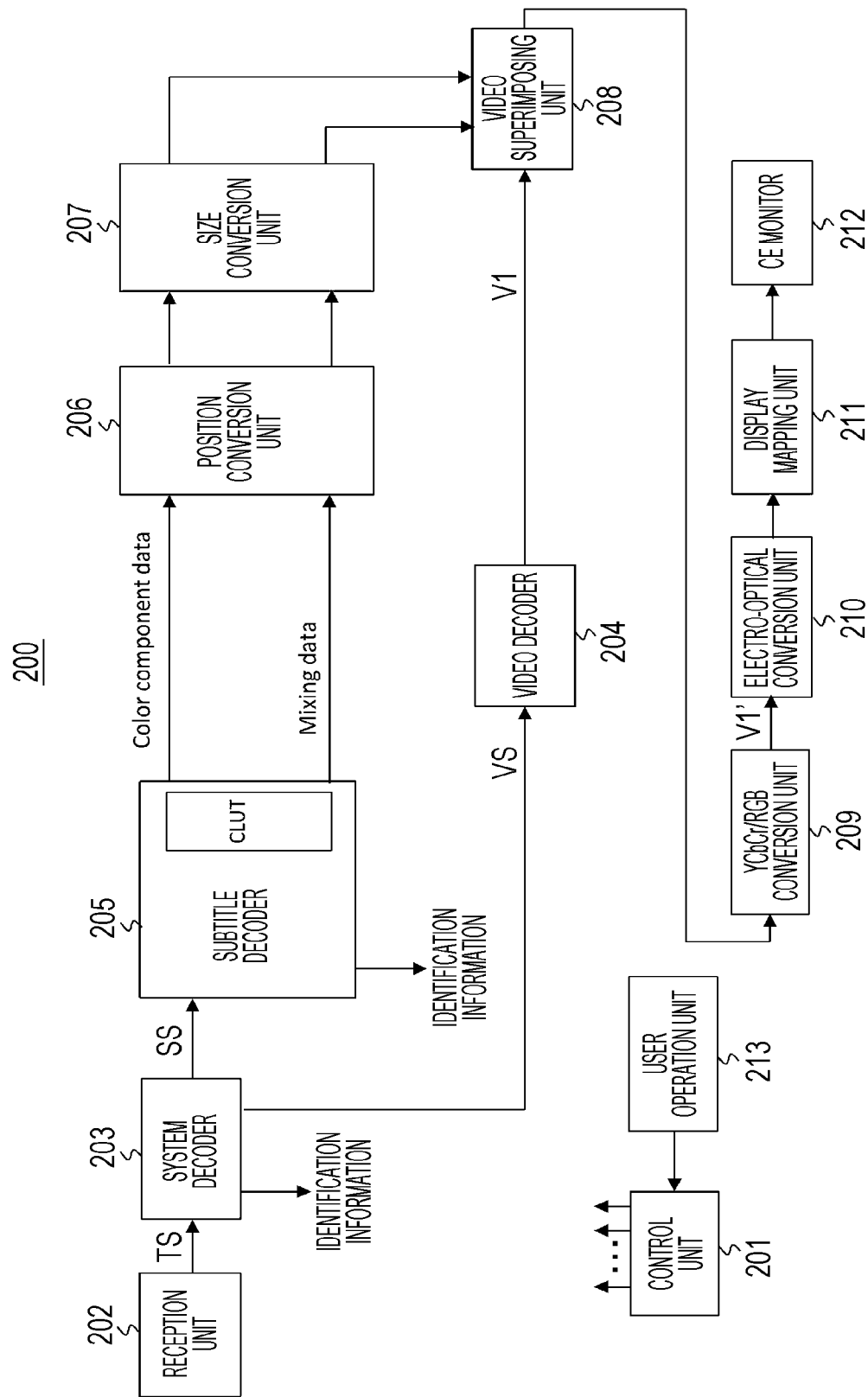
FIG. 15 is a block diagram illustrating an exemplary configuration of a reception apparatus.

FIG. 15 illustrates an exemplary configuration of the reception apparatus 200. This reception apparatus 200 includes a control unit 201, a reception unit 202, a system decoder 203, a video decoder 204, a subtitle decoder 205, a position conversion unit 206, and a size conversion unit 207. Furthermore, the reception apparatus 200 includes a video superimposing unit 208, a YCbCr/RGB conversion unit 209, an electro-optical conversion unit 210, a display mapping unit 211, a CE monitor 212, and a user operation unit 213.

The control unit 201 includes a central processing unit (CPU), and controls the operation of each unit of the reception apparatus 200 on the basis of a control program. The user operation unit 213 is a switch, a touch panel, a remote control transmission unit, or the like for a user such as a viewer to perform various operations.

The reception unit 202 receives the transport stream TS transmitted from the transmission apparatus 100 on a broadcast wave or in a network packet. The system decoder 203 extracts the video stream VS and the subtitle stream SS from this transport stream TS.

Furthermore, the system decoder 203 extracts various kinds of information inserted into the transport stream TS (container), and transmits the information to the control unit 201. This extracted information also includes the component descriptor (see FIG. 13) in which the identification information ("display_positioning_type") is described. The identification information indicates the position specification method for the subtitles. In this manner, the control unit 201 recognizes the position specification method for the subtitles.

The video decoder 204 performs decoding processing on the video stream VS extracted by the system decoder 203, and outputs the transmission video data V1 with UHD resolution. As described above, the UHD resolution exceeds the HD resolution and includes 4K resolution or 8K resolution. Furthermore, the parameter sets and SEI messages inserted into each access unit constituting the video stream VS are extracted and transmitted to the control unit 201 by the video decoder 204.

The subtitle decoder 205 performs decoding processing on the subtitle stream SS to obtain the bitmap data (Color component data) of the subtitles and the mixing ratio information (Mixing data) on the subtitles and the background video. Note that the subtitle stream SS includes the bitmap data of the subtitles as subtitle data, and this bitmap data is transmitted to the CLUT. Therefore, the bitmap data (Color component data) and the mixing ratio information (Mixing data) can be obtained in units of pixels by using the CLUT constituted on the basis of the CLUT definition segment (CLUT_definition_segment) (see FIG. 8).

Furthermore, the identification information ("display_positioning_type") indicating the position specification method for the subtitles, which is inserted into the display definition segment (DDS), is extracted and transmitted to the control unit 201 by the subtitle decoder 205. In this manner, the control unit 201 recognizes the position specification method for the subtitles.

The position conversion unit 206, together with the subtitle decoder 205, constitutes a bitmap data obtaining unit. Under the control of the control unit 201, the position conversion unit 206 performs, on the bitmap data (Color component data) and the mixing ratio information (Mixing data) obtained by the subtitle decoder 205, processing of converting the position of the subtitles in accordance with the position specification method for the subtitles, which is specified by the identification information ("display_positioning_type").

Here, in a case where the second method is indicated by "display_positioning_type"="01", the position coordinates of the regions are recognized as offset pixel values from the base point (sfx, sfy) of the window, and are converted into the coordinates of the UHD display area which is the entire display area (see FIGS. 9(a) and 9(b)). This conversion is performed by adding the position information on the base point of the window to the position coordinates of the regions (see FIG. 9(c)). Here, "regionA_width"=W1, "regionA_height"=h1, "regionB_width"=W2, and "regionB_height"=h2.

Furthermore, in a case where the third method is indicated by "display_positioning_type"="10", the position coordinates of the regions are recognized as offset pixel values from the base point (0, 0) of the UHD display area (see FIG. 11(a)). In this case, since the position coordinates of the regions are already the coordinates of the UHD display area, the conversion of the coordinates is not performed (see FIG. 11(b)). Here, "regionA_width"=W1, "regionA_height"=h1, "regionB_width"=W2, and "regionB_height"=h2.

Furthermore, in a case where the first method is indicated by "display_positioning_type"="00", the position coordinates of the regions are recognized as offset pixel values from the base point (0, 0) of the HD display area (see FIG. 12(a)). In this case, since the position coordinates of the regions are the coordinates of the HD display area, the position coordinates of the regions are therefore converted into the coordinates of the UHD display area on the basis of the ratio m of the UHD resolution to the HD resolution in accordance with the relationship with the image frame of the video (see FIG. 12(b)). Here, "regionA_width"=W1, "regionA_height"=h1, "regionB_width"=W2, and "regionB_height"=h2.

Figure 16:
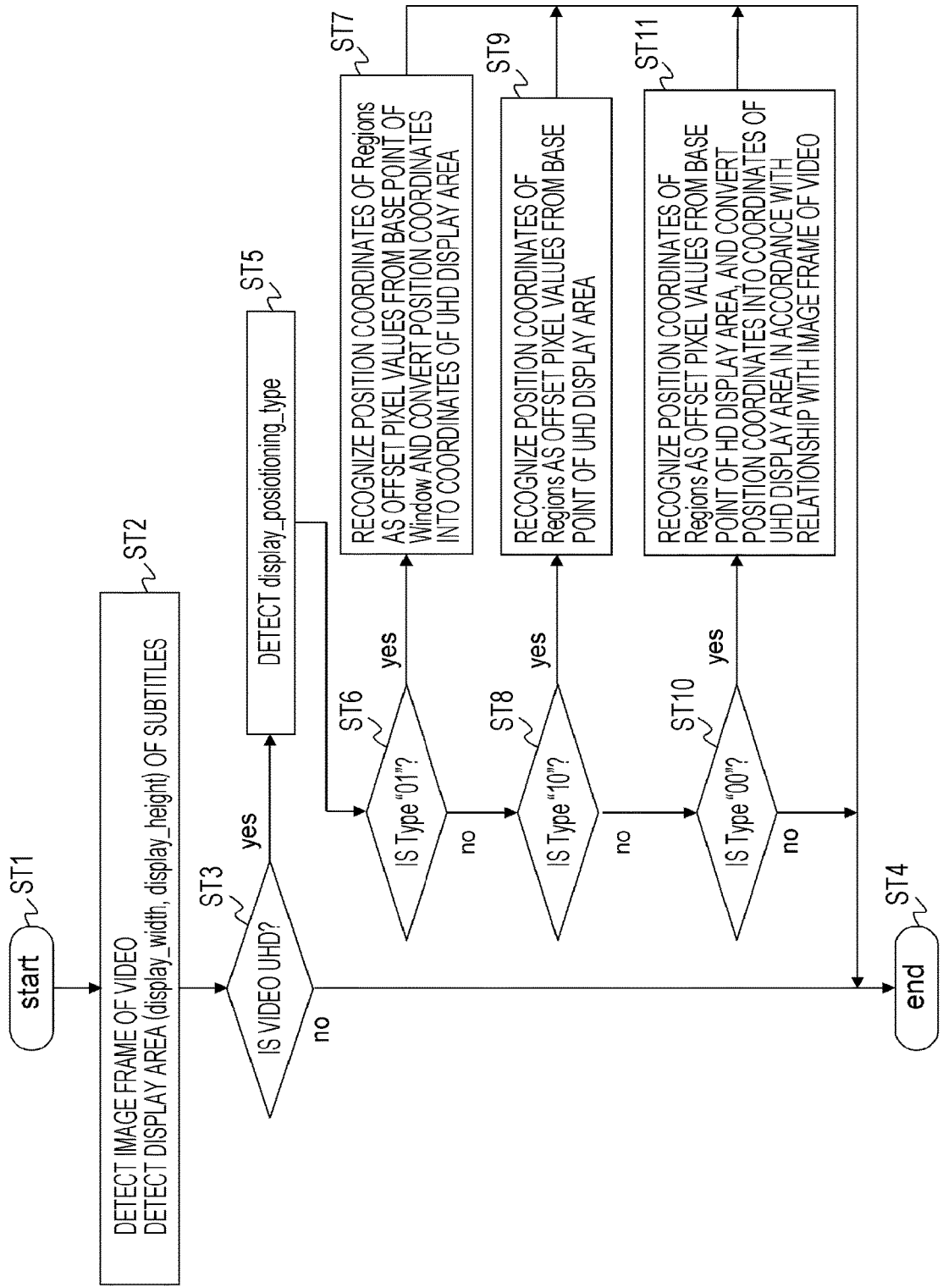
FIG. 16 is a flowchart illustrating an example of position conversion processing in a position conversion unit.

The flowchart in FIG. 16 illustrates an example of the position conversion processing in the position conversion unit 206. Note that the related processing in the control unit 201 will also be described as the processing in the position conversion unit 206 here.

The position conversion unit 206 first starts processing in step ST1. Next, the position conversion unit 206 detects the image frame of the video, that is, the resolution of the video in step ST2. Note that the information on the resolution of the video can be detected from the parameter set (SPS) of the video stream. In this step ST2, furthermore, the position conversion unit 206 also detects the resolution of the subtitles, that is, the display area of the subtitles. The display area (display_width, display_height) of the subtitles can be detected from the display definition segment (DDS) (see FIG. 4).

Next, the position conversion unit 206 determines whether the resolution of the video is the UHD resolution in step ST3. In a case where the resolution is determined not to be the UHD resolution, the position conversion unit 206 ends the processing in step ST4. On the other hand, in a case where the resolution is determined to be the UHD resolution, the position conversion unit 206 proceeds to the processing in step ST5. In the present embodiment, since the resolution of the video is the UHD resolution, the position conversion unit 206 proceeds to the processing in step ST5. In this step ST5, the position conversion unit 206 detects the identification information ("display_positioning_type").

Next, the position conversion unit 206 determines whether "display_positioning_type"="01" is true in step ST6. In a case where the second method is indicated by "display_positioning_type"="01", the position conversion unit 206 proceeds to the processing in step ST7.

In this step ST7, the position conversion unit 206 recognizes the position coordinates of the regions as offset pixel values from the base point (sfx, sfy) of the window and converts the position coordinates into the coordinates of the UHD display area which is the entire display area (see FIGS. 9(a) and 9(b)). In this case, the conversion is performed by adding the position information on the base point of the window to the position coordinates of the regions (see FIG. 9(c)). In step ST4, the position conversion unit 206 ends the processing following the processing in step ST7.

Furthermore, in a case where "display_positioning_type"="01" is determined not to be true in step ST6, the position conversion unit 206 proceeds to the processing in step ST8. In this step ST8, whether "display_positioning_type"="10" is true is determined. In a case where the third method is indicated by "display_positioning_type"="10", the position conversion unit 206 proceeds to the processing in step ST9.

In this step ST9, the position conversion unit 206 recognizes the position coordinates of the regions as offset pixel values from the base point (0, 0) of the UHD display area (see FIG. 11(a)). In this case, since the position coordinates of the regions are already the coordinates of the UHD display area, the position conversion unit 206 does not perform the conversion of the coordinates (see FIG. 11(b)). In step ST4, the position conversion unit 206 ends the processing following the processing in step ST9.

Furthermore, in a case where "display_positioning_type"="10" is determined not to be true in step ST8, the position conversion unit 206 proceeds to the processing in step ST10. In this step ST10, whether "display_positioning_type"="00" is true is determined. In a case where "display_positioning_type"="00" is determined not to be true, the position conversion unit 206 ends the processing in step ST4. On the other hand, in a case where "display_positioning_type"="00" is determined to be true, the position conversion unit 206 proceeds to the processing in step ST11.

In this step ST11, the position conversion unit 206 recognizes the position coordinates of the regions as offset pixel values from the base point (0, 0) of the HD display area (see FIG. 12(a)). In this case, since the position coordinates of the regions are the coordinates of the HD display area, the position conversion unit 206 converts, therefore, the position coordinates of the regions into the coordinates of the UHD display area on the basis of the ratio m of the UHD resolution to the HD resolution, in accordance with the relationship with the image frame of the video (see FIG. 12(b)). In step ST4, the position conversion unit 206 ends the processing following the processing in step ST11.

Referring back to FIG. 15, the size conversion unit 207 performs processing of converting the size of the subtitles on the bitmap data (Color component data) and the mixing ratio information (Mixing data) outputted from the position conversion unit 206, in response to the operation of the user such as a viewer, or automatically in accordance with the relationship between the resolution of the video and the resolution of the subtitles, for example.

Figure 17:
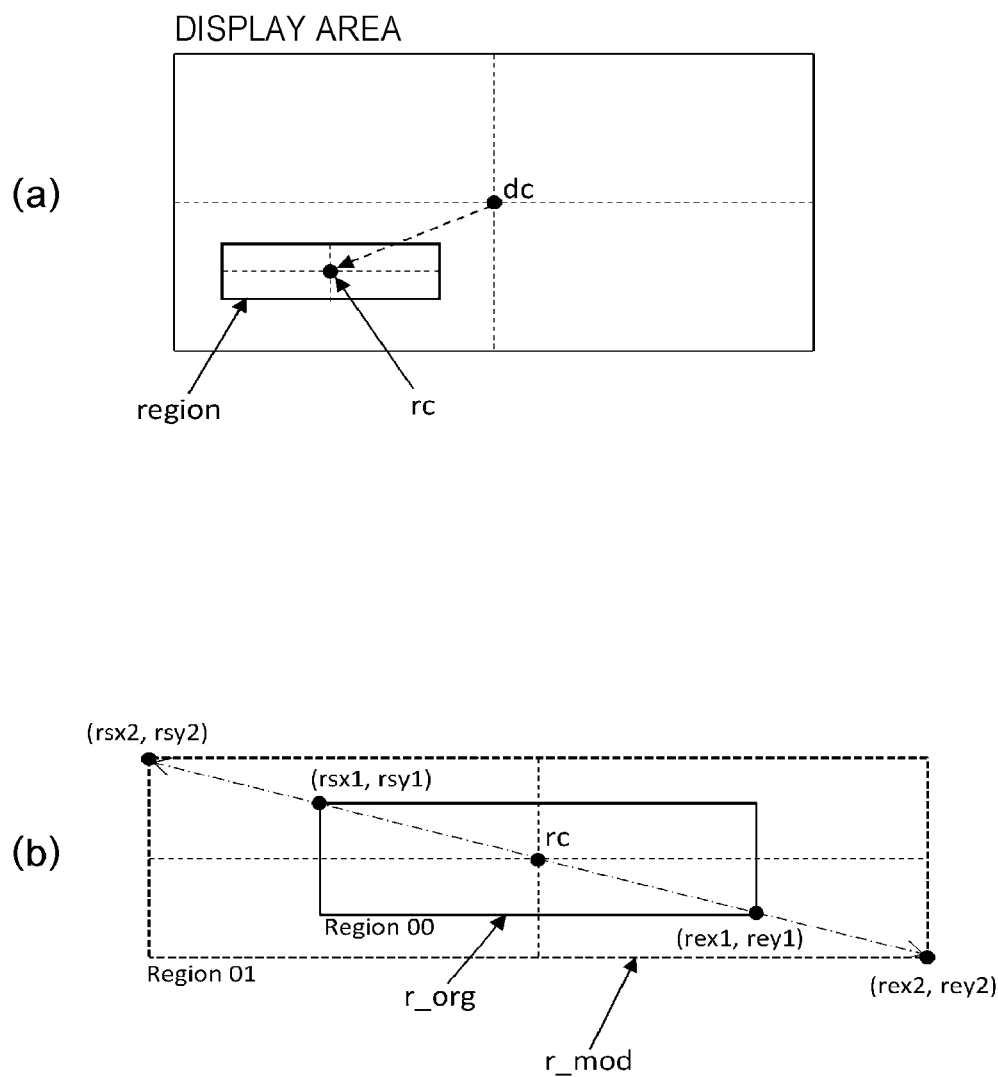
FIG. 17 is a diagram provided for describing processing of converting a size of the subtitles.

As illustrated in FIG. 17(a), the distance from the center position (dc: display center) of the display area to the center position of the region (region), that is, a point (region center position: rc) at which the region is divided into two in the horizontal and vertical directions, is determined in proportion to the resolution of the video. For example, in a case where the resolution of the video is assumed to be HD and the center position rc of the region is defined from the center position dc of the display area of the caption, the position is controlled such that in a case where the resolution of the video is 4K (=3840×2160), the number of pixels is doubled in the distance from dc to rc.

As illustrated in FIG. 17(b), in a case where the size of the region (Region) is changed from r_org (Region 00) to r_mod (Region 01), the start position (rsx1, rsy1) and the end position (rex1, rey1) are modified to the start position (rsx2, rsy2) and the end position (rex2, rey2), respectively, so as to satisfy the Ratio=(r_mod/r_org).

In other words, the ratio of the distance from rc to (rsx2, rsy2) to the distance from rc to (rsx1, rsy1) and the ratio of the distance from rc to (rex2, rey2) to the distance from rc to (rex1, rey1) are made consistent with the Ratio. Such a configuration can keep the center position rc of the region unchanged even after the size conversion. As such, it is possible to convert the size of the subtitles (region) while keeping the relative positional relationship consistent in the entire display area.

Referring back to FIG. 15, the video superimposing unit 208 superimposes the bitmap data (Color component data) of the subtitles, which has been obtained through the position conversion unit 206 and the size conversion unit 207, on the transmission video data V1 obtained by the video decoder 204. In this case, the video superimposing unit 208 mixes the bitmap data of the subtitles at the mixing ratio indicated by the mixing ratio information (Mixing data).

Transmission video data V1' on which the bitmap data of the subtitles is superimposed is converted from the YCbCr (luminance and chrominance) domain to the RGB domain by the YCbCr/RGB conversion unit 209. The electro-optical conversion unit 210 performs electro-optical conversion on the transmission video data V1', which has been converted into the RGB domain, by applying an electro-optical conversion characteristic corresponding to a photoelectric conversion characteristic applied to the transmission video data V1', and obtains video data for display which is for displaying an image.

The display mapping unit 211 performs, on the video data for display, display luminance adjustment corresponding to the maximum luminance display capability or the like of the CE monitor 212. The CE monitor 212 displays the image on the basis of the video data for display. Examples of this CE monitor 212 include a liquid crystal display (LCD) and an organic electroluminescence display (organic EL display).

The operation of the reception apparatus 200 illustrated in FIG. 15 will be briefly described. In the reception unit 202, the transport stream TS transmitted from the transmission apparatus 100 on a broadcast wave or in a network packet is received. This transport stream TS is supplied to the system decoder 203. In the system decoder 203, the video stream VS and the subtitle stream SS are extracted from this transport stream TS.

In the system decoder 203, furthermore, various kinds of information inserted into the transport stream TS (container) are extracted and transmitted to the control unit 201. This extracted information also includes the component descriptor (see FIG. 13) in which the identification information ("display_positioning_type") is described. The identification information indicates the position specification method for the subtitles. With this configuration, the position specification method for the subtitles is recognized in the control unit 201.

The video stream VS extracted in the system decoder 203 is supplied to the video decoder 204. In the video decoder 204, decoding processing is performed on the video stream VS, through which the transmission video data V1 is obtained. In the video decoder 204, furthermore, the parameter sets and SEI messages inserted into each access unit constituting the video stream VS are extracted and transmitted to the control unit 201.

The subtitle stream SS extracted in the system decoder 203 is supplied to the subtitle decoder 205. In this subtitle decoder 205, decoding processing is performed on the subtitle stream SS, through which the bitmap data (Color component data) of the subtitles and the mixing ratio information (Mixing data) on the subtitles and the background video are obtained.

In the subtitle decoder 205, furthermore, the identification information ("display_positioning_type") indicating the position specification method for the subtitles, which is inserted into the display definition segment (DDS), is extracted and transmitted to the control unit 201. With this configuration, the position specification method for the subtitles is recognized in the control unit 201.

The bitmap data of the subtitles and the mixing ratio information outputted from the subtitle decoder 205 are supplied to the position conversion unit 206. Under the control of the control unit 201, this position conversion unit 206 performs processing of converting the position of the subtitles on the bitmap data of the subtitles and the mixing ratio information in accordance with the position specification method for the subtitles, which is specified by the identification information ("display_positioning_type").

The bitmap data and the mixing ratio information outputted from the position conversion unit 206 are supplied to the size conversion unit 207. In this size conversion unit 207, processing of converting the size of the subtitles is performed on the bitmap data of the subtitles and the mixing ratio information, in response to the operation of the user such as a viewer, or automatically in accordance with the relationship between the resolution of the video and the resolution of the subtitles, for example.

The transmission video data V1 obtained in the video decoder 204 is supplied to the video superimposing unit 208. Furthermore, the bitmap data of the subtitles and the mixing ratio information obtained through the position conversion unit 206 and the size conversion unit 207 are supplied to the video superimposing unit 208. In the video superimposing unit 208, the bitmap data of the subtitles is superimposed on the transmission video data V1. In this case, the bitmap data of the subtitles is mixed at the mixing ratio indicated by the mixing ratio information.

The transmission video data V1' on which the bitmap data is superimposed is supplied to the YCbCr/RGB conversion unit 209. In this YCbCr/RGB conversion unit 209, the transmission video data V1' is converted from the YCbCr (luminance and chrominance) domain to the RGB domain and supplied to the electro-optical conversion unit 210. In the electro-optical conversion unit 210, electro-optical conversion is performed on the transmission video data V1' by applying the electro-optical conversion characteristic corresponding to the photoelectric conversion characteristic applied to the transmission video data V1', through which the video data for display is obtained. The video data for display is for displaying an image.

This video data for display is supplied to the display mapping unit 211. In this display mapping unit 211, display luminance adjustment corresponding to the maximum luminance display capability or the like of the CE monitor 212 is performed on the video data for display. The video data for display on which the display luminance adjustment is performed in this manner is supplied to the CE monitor 212. The image is displayed on the CE monitor 212 on the basis of this video data for display.

As described above, in a case where the resolution of the subtitles is the HD resolution and does not match the UHD resolution of the video in the transmission and reception system 10 illustrated in FIG. 1, the reception apparatus 200 performs processing of converting the position of the subtitles. Accordingly, it is possible to display the subtitles at an appropriate position of the background video.

In the transmission and reception system 10 in FIG. 1, furthermore, the reception apparatus 200 obtains the bitmap data of the subtitles for display by performing, on the subtitle stream, the processing corresponding to the position specification method indicated by the identification information. Therefore, even in a case where the resolution of the subtitles is the HD resolution and does not match the UHD resolution of the video, it is possible to display the subtitles at an appropriate position of the background video.

In the transmission and reception system 10 in FIG. 1, furthermore, the transmission apparatus 100 transmits the identification information inserted into the layer of the subtitle stream SS and/or the layer of the transport stream TS as the container. The identification information indicates the position specification method for the subtitles. On the reception side, therefore, the processing corresponding to the position specification method indicated by this identification information is performed on the subtitle stream, through which the bitmap data of the subtitles for display is obtained. As such, the subtitles can be superimposed and displayed on the video satisfactorily.

2. MODIFICATION

Note that the embodiment described above has presented the example of converting the position of the subtitles and the like. The present technology can also be similarly applied to the case where graphics and other similar information are superimposed and displayed on a video.

Furthermore, the embodiment described above has presented the example where the container is MPEG-2 TS. However, the present technology does not limit the container to be MPEG-2 TS, but can be similarly applied to the case of other packets such as ISOBMFF and MMT, for example.

Furthermore, the present technology can also have a configuration as follows.

(1) A reception apparatus including:
a reception unit configured to receive a container in a predetermined format including a video stream having video data with UHD resolution and a subtitle stream having subtitle data;
a video decoding unit configured to obtain the video data by performing decoding processing on the video stream;
a subtitle decoding unit configured to obtain bitmap data of subtitles by performing decoding processing on the subtitle stream;
a position conversion unit configured to, in a case where a resolution of the subtitles does not match the UHD resolution, perform processing of converting a position of the subtitles on the bitmap data of the subtitles; and
a video superimposing unit configured to superimpose, on the video data, the bitmap data of the subtitles on which the processing of converting the position has been performed.

(2) The reception apparatus according to (1) above,
in which the UHD resolution exceeds HD resolution and includes 4K resolution or 8K resolution.

(3) The reception apparatus according to (1) or (2) above, further including:
a size conversion unit interposed between the position conversion unit and the video superimposing unit and configured to perform processing of converting a size of the subtitles on the bitmap data of the subtitles on which the processing of converting the position has been performed.

(4) A reception method including:
a reception step of receiving, by a reception unit, a container in a predetermined format including a video stream having video data with UHD resolution and a subtitle stream having subtitle data;
a video decoding step of obtaining the video data by performing decoding processing on the video stream;
a subtitle decoding step of obtaining bitmap data of subtitles by performing decoding processing on the subtitle stream;
a position conversion step of, in a case where a resolution of the subtitles does not match the UHD resolution, performing processing of converting a position of the subtitles on the bitmap data of the subtitles; and
a video superimposing step of superimposing, on the video data, the bitmap data of the subtitles on which the processing of converting the position has been performed.

(5) A reception apparatus including:
a reception unit configured to receive a container in a predetermined format including a video stream having video data with UHD resolution and a subtitle stream having subtitle data;
a video decoding unit configured to obtain the video data by performing decoding processing on the video stream;
a bitmap data obtaining unit configured to obtain bitmap data of subtitles for display on the basis of the subtitle stream; and
a video superimposing unit configured to superimpose, on the video data, the bitmap data of the subtitles for display which has been obtained,
in which identification information indicating a position specification method for subtitles is inserted into a layer of the subtitle stream and/or a layer of the container, and
the bitmap data obtaining unit obtains the bitmap data of the subtitles for display by performing, on the subtitle stream, processing corresponding to the position specification method indicated by the identification information.

(6) The reception apparatus according to (5) above,
in which in a case where the position specification method indicated by the identification information is a method of specifying a position in an HD display area in units of HD pixels, the bitmap data obtaining unit performs decoding processing on the subtitle stream to obtain bitmap data of the subtitles, and performs position conversion processing on the bitmap data on the basis of a ratio of the UHD resolution to the HD resolution to obtain the bitmap data of the subtitles for display.

(7) The reception apparatus according to (5) or (6) above,
in which in a case where the position specification method indicated by the identification information is a method of defining an HD display area with a window in a UHD display area and specifying a position in a display area of the window, the bitmap data obtaining unit performs decoding processing on the subtitle stream to obtain bitmap data of the subtitles, and performs position conversion processing on the bitmap data on the basis of information on the display area of the window to obtain the bitmap data of the subtitles for display.

(8) The reception apparatus according to any one of (5) to (7) above,
in which in a case where the position specification method indicated by the identification information is a method of specifying a position in a UHD display area in units of UHD pixels, the bitmap data obtaining unit performs decoding processing on the subtitle stream to obtain bitmap data of the subtitles, and uses the bitmap data as it is as the bitmap data of the subtitles for display.

(9) The reception apparatus according to any one of (5) to (8) above, further including:
a subtitle processing unit interposed between the bitmap data obtaining unit and the video superimposing unit and configured to perform processing of converting a size of the subtitles on the bitmap data of the subtitles which has been obtained by the bitmap data obtaining unit.

(10) A reception method including:
a reception step of receiving, by a reception unit, a container in a predetermined format including a video stream having video data with UHD resolution and a subtitle stream having subtitle data;
a video decoding step of obtaining the video data by performing decoding processing on the video stream;
a bitmap data obtaining step of obtaining bitmap data of subtitles for display on the basis of the subtitle stream; and
a video superimposing step of superimposing, on the video data, the bitmap data of the subtitles which has been obtained,
in which identification information indicating a position specification method for the subtitles is inserted into a layer of the subtitle stream and/or a layer of the container, and the bitmap data obtaining step obtains the bitmap data of the subtitles for display by performing, on the subtitle stream, processing corresponding to the position specification method indicated by the identification information.

(11) A transmission apparatus including:

a transmission unit configured to transmit a container in a predetermined format including a video stream having video data with UHD resolution and a subtitle stream having subtitle data; and an information insertion unit configured to insert identification information indicating a position specification method for subtitles into a layer of the subtitle stream and/or a layer of the container.

(12) The transmission apparatus according to (11) above, in which the position specification method for the subtitles includes a method of specifying a position in an HD display area in units of HD pixels.

(13) The transmission apparatus according to (11) or (12) above, in which the position specification method for the subtitles includes a method of defining an HD display area with a window in a UHD display area and specifying a position in a display area of the window.

(14) The transmission apparatus according to any one of (11) to (13) above, in which the position specification method for the subtitles includes a method of specifying a position in a UHD display area in units of UHD pixels.

(15) The transmission apparatus according to any one of (11) to (14) above, in which the information insertion unit inserts the identification information under an event information table, a service description table, or a selection information table.

(16) The transmission apparatus according to any one of (11) to (15) above, in which the information insertion unit inserts the identification information into a display definition segment.

(17) A transmission method including:

a transmission step of transmitting, from a transmission unit, a container in a predetermined format including a video stream having video data with UHD resolution and a subtitle stream having subtitle data; and an information insertion step of inserting identification information indicating a position specification method for subtitles into a layer of the subtitle stream and/or a layer of the container.

(18) A reception apparatus including:

a reception unit configured to receive a container in a predetermined format including a video stream having video data with UHD resolution and a graphics stream having graphics data;

a video decoding unit configured to obtain the video data by performing decoding processing on the video stream;

a graphics decoding unit configured to obtain bitmap data of graphics by performing decoding processing on the graphics stream;

a position conversion unit configured to, in a case where a resolution of the graphics does not match the UHD resolution, perform processing of converting a position of the graphics on the bitmap data of the graphics; and a video superimposing unit configured to superimpose, on the video data, the bitmap data of the graphics on which the processing of converting the position has been performed.

(19) A reception apparatus including:

a reception unit configured to receive a container in a predetermined format including a video stream having video data with UHD resolution and a graphics stream having graphics data;

a video decoding unit configured to obtain the video data by performing decoding processing on the video stream;

a bitmap data obtaining unit configured to obtain bitmap data of graphics for display on the basis of the graphics stream; and a video superimposing unit configured to superimpose, on the video data, the bitmap data of the graphics which has been obtained, in which identification information indicating a position specification method for the graphics is inserted into a layer of the graphics stream and/or a layer of the container, and the bitmap data obtaining unit obtains the bitmap data of the graphics for display by performing, on the graphics stream, processing corresponding to the position specification method indicated by the identification information.

(20) A transmission apparatus including:

a transmission unit configured to transmit a container in a predetermined format including a video stream having video data with UHD resolution and a graphics stream having graphics data; and an information insertion unit configured to insert identification information indicating a position specification method for graphics into a layer of the graphics stream and/or a layer of the container.

A main feature of the present technology is that in a case where the resolution of subtitles is HD resolution and does not match UHD resolution of a video, processing of converting a position of the subtitles can display the subtitles at an appropriate position of the background video (see FIG. 15). Additionally, a main feature of the present technology is that even in a case where the resolution of subtitles is HD resolution and does not match UHD resolution of a video, obtaining bitmap data of subtitles for display by performing processing corresponding to the position specification method indicated by identification information in a subtitle stream can display the subtitles at an appropriate position of the background video (see FIG. 16).

REFERENCE SIGNS LIST

10 Transmission and reception system
100 Transmission apparatus
101 Control unit
102 Camera
103 Video photoelectric conversion unit
104 RGB/YCbCr conversion unit
105 Video encoder
106 Subtitle generation unit
107 Bitmap data generation unit
108 Subtitle encoder
109 System encoder
110 Transmission unit
200 Reception apparatus
201 Control unit
202 Reception unit
203 System decoder
204 Video decoder
205 Subtitle decoder
206 Position conversion unit
207 Size conversion unit
208 Video superimposing unit
209 YCbCr/RGB conversion unit
210 Electro-optical conversion unit
211 Display mapping unit
212 CE monitor
213 User operation unit

The invention claimed is:

1. An apparatus comprising:
a processor configured to
receive a container including a video stream having video data with ultra high definition (UHD) resolution and a subtitle stream having subtitle data;
obtain the video data by decoding the video stream;
determine a processing method from a plurality of processing methods based on identification information included in a layer of the subtitle stream and/or a layer of the container, each processing method of the plurality of processing methods being associated with a subtitle display positioning type;
obtain bitmap data of subtitles for display on the basis of the subtitle stream; and
superimpose, on the video data, the bitmap data of the subtitles for display,
wherein the bitmap data of the subtitles for display are obtained using the determined processing method indicated by the identification information, and
a first method of the plurality of methods indicates a high definition (HD) display area, a start position and an end position of a rendering position of the subtitles as offset pixel values from a base point of the HD display area, a second method of the plurality of methods defines a window in the HD display area as coordinates from the base point of the HD display area and the start position and the end position of the rendering position of the subtitles as offset pixel values from a base point of the window, and a third method of the plurality of methods indicates the start position and the end position of the rendering position of the subtitles as offset pixel values from a base point of an UHD display area in UHD pixels.

2. The apparatus according to claim 1, wherein the processor is further configured to:
decode the subtitle stream to obtain the bitmap data of the subtitles, and
convert the bitmap data on the basis of a ratio of the UHD resolution to a HD resolution to obtain the bitmap data of the subtitles for display when the processing method indicated by the identification information is the first method.

3. The apparatus according to claim 1, wherein the processor is further configured to:
decode the subtitle stream to obtain the bitmap data of the subtitles, and
convert the bitmap data on the basis of information on the HD display area of a window in a UHD display area to obtain the bitmap data of the subtitles for display when the processing method indicated by the identification information is the second method.

4. The apparatus according to claim 1, wherein the processor is further configured to:
decode the subtitle stream to obtain the bitmap data of the subtitles, and
use the bitmap data as the bitmap data of the subtitles for display when the processing method indicated by the identification information is the third method.

5. The apparatus according to claim 1, wherein the processor is further configured to:
convert a size of the subtitles, and
superimpose, on the video data, the bitmap data of the subtitles of the converted size.

6. The apparatus of claim 1, wherein the identification information includes a window flag indicating that the identification information further includes information associated with a size of the window.

7. A reception method comprising:
receiving, by a receiver, a container including a video stream having video data with ultra high definition (UHD) resolution and a subtitle stream having subtitle data;
obtaining the video data by decoding the video stream;
determining a processing method from a plurality of processing methods based on identification information included in a layer of the subtitle stream and/or a layer of the container, each processing method of the plurality of processing methods being associated with a subtitle display positioning type;
obtaining bitmap data of subtitles for display on the basis of the subtitle stream; and
superimposing, on the video data, the bitmap data of the subtitles for display,
wherein the bitmap data of the subtitles for display are obtained using the determined processing method indicated by the identification information, and
a first method of the plurality of methods indicates a high definition (HD) display area, a start position and an end position of a rendering position of the subtitles as offset pixel values from a base point of the HD display area, a second method of the plurality of methods defines a window in the HD display area as coordinates from the base point of the HD display area and the start position and the end position of the rendering position of the subtitles as offset pixel values from a base point of the window, and a third method of the plurality of methods indicates the start position and the end position of the rendering position of the subtitles as offset pixel values from a base point of an UHD display area in UHD pixels.

8. An apparatus comprising:
transmission circuitry configured to transmit a container including a video stream having video data with ultra high definition (UHD) resolution and a subtitle stream having subtitle data; and
a processor configured to insert identification information indicating a processing method from a plurality of processing methods into a layer of the subtitle stream and/or a layer of the container, each processing method of the plurality of processing methods being associated with a subtitle display positioning type;
wherein a first method of the plurality of methods indicates a high definition (HD) display area, a start position and an end position of a rendering position of the subtitles as offset pixel values from a base point of the HD display area, a second method of the plurality of methods defines a window in the HD display area as coordinates from the base point of the HD display area and the start position and the end position of the rendering position of the subtitles as offset pixel values from a base point of the window, and a third method of the plurality of methods indicates the start position and the end position of the rendering position of the subtitles as offset pixel values from a base point of an UHD display area in UHD pixels.

9. The apparatus according to claim 8, wherein the processor inserts the identification information under an event information table, a service description table, or a selection information table.

10. The apparatus according to claim 8, wherein the processor inserts the identification information into a display definition segment.

11. A transmission method comprising:
transmitting, using transmitting circuitry, a container including a video stream having video data with ultra high definition (UHD) resolution and a subtitle stream having subtitle data;
inserting identification information indicating a processing method from a plurality of processing methods into a layer of the subtitle stream and/or a layer of the container, each processing method of the plurality of processing methods being associated with a subtitle display positioning type; and
wherein a first method of the plurality of methods indicates a high definition (HD) display area, a start position and an end position of a rendering position of the subtitles as offset pixel values from a base point of the HD display area, a second method of the plurality of methods defines a window in the HD display area as coordinates from the base point of the HD display area and the start position and the end position of the rendering position of the subtitles as offset pixel values from a base point of the window, and a third method of the plurality of methods indicates the start position and the end position of the rendering position of the subtitles as offset pixel values from a base point of an UHD display area in UHD pixels.

* * * * *